(12) United States Patent
Zanon

(10) Patent No.: US 6,427,460 B1
(45) Date of Patent: Aug. 6, 2002

(54) REFRIGERATION SYSTEM HAVING A REFRIGERATION CYCLE WHICH PROVIDES OPTIMIZED CONSUMPTION

(76) Inventor: Luciano Zanon, 32010 Chies d'Alpago, Via Ugo Foscolo, 35 (IT)

( * ) Notice: Subject to any disclaimer, the term of this patent is extended or adjusted under 35 U.S.C. 154(b) by 0 days.

(21) Appl. No.: 09/537,665

(22) Filed: Mar. 29, 2000

(30) Foreign Application Priority Data

Apr. 19, 1999 (IT) ........................................ TV99A0044

(51) Int. Cl.[7] .............................................. F25B 41/00
(52) U.S. Cl. ........................ 62/174; 62/196.4; 62/509; 62/510; 62/175
(58) Field of Search ...................... 62/174, 175, 196.3, 62/196.4, 509, 510, 228.5; 236/1 EA

(56) References Cited

U.S. PATENT DOCUMENTS

| | | | | |
|---|---|---|---|---|
| 3,122,003 A | * | 2/1964 | Sullivan | 62/510 X |
| 3,885,938 A | * | 5/1975 | Ordonez | 62/510 X |
| 3,984,224 A | * | 10/1976 | Dawkins | 62/510 X |
| 4,317,334 A | * | 3/1982 | Burgess | 62/509 X |
| 4,324,106 A | * | 4/1982 | Ross et al. | 62/509 X |
| 4,418,548 A | | 12/1983 | Sawyer | |
| 4,658,596 A | | 4/1987 | Kuwahara | |

OTHER PUBLICATIONS

Patent Abstracts of Japan vol. 016, No. 135 (M–1230), Apr. 6, 1992 & JP 03 294754 A (Dakin Ind Ltd), Dec. 25, 1991 *abstract*.
Patent Abstracts of Japan vol. 2000, No. 17, Jun. 5, 2001 & JP 01 141796 A (Toppan Printing Co Ltd), Jun. 2, 1989 *abstract*.

* cited by examiner

*Primary Examiner*—Harry B. Tanner
(74) *Attorney, Agent, or Firm*—Guido Modiano; Albert Josif; Daniel J. O'Byrne

(57) ABSTRACT

A refrigeration system having a refrigeration cycle which provides optimized consumption, comprising a main section, which is constituted by at least one main compressor, a main condenser, which is connected between the compressor and at least one expansion valve, and at least one evaporator, which is connected to the expansion valve, which comprises an auxiliary section comprising at least one auxiliary compressor which is connected to a low-pressure intake line of the main compressor, at least one auxiliary condenser which is connected to the auxiliary compressor, and a first auxiliary reservoir and a second auxiliary reservoir which are respectively connected to the output of the auxiliary condenser and to the output of the main condenser, for connection to the at least one expansion valve.

12 Claims, 6 Drawing Sheets

REFRIGERATION SYSTEM HAVING A REFRIGERATION CYCLE WHICH PROVIDES OPTIMIZED CONSUMPTION

BACKGROUND OF THE INVENTION

The present invention relates to a refrigeration system with a refrigeration cycle which provides optimized consumption.

More particularly, the invention relates to a refrigeration system which allows to save energy with respect to conventional refrigeration systems, which are adapted to refrigerate enclosed spaces or masses in general and to keep them at a lower temperature than the outside environment by using an external power source.

Among refrigeration systems or refrigeration machines, the most widely used type is the so-called vapor-compression type, which operates by converting mechanical energy into heat energy by means of the single or multiple reverse thermodynamic cycle in which a refrigerant fluid evolves.

In some of the conversions of the cycle, the fluid is in the superheated saturated vapor phase. Of the heat energy produced by the conversion, a certain fraction, determined on the basis of the first and second laws of thermodynamics, is used at a temperature below the temperature outside the system in order to refrigerate enclosed spaces or masses.

FIG. 1 is an enthalpy chart of the conventional type, in which enthalpy H per unit mass is plotted on the X-axis and the Y-axis plots the logarithm of pressure.

FIG. 1 plots two isothermal lines H1 and H2 on which state transitions occur at a different pressure and with different temperatures.

The region between the upper and lower limiting curves is known as wet vapor region, since liquid and vapor are simultaneously present. It can also be noted that the enthalpies required to change state vary according to the pressure and tend to decrease (H2 is smaller than H1) as one approaches the critical pressure C, at which the state transition occurs without requiring heat.

FIG. 2 is an enthalpy chart which plots a conventional refrigeration cycle.

The various steps of a refrigeration cycle, which can be provided for example by means of a refrigeration system as shown in FIG. 3, are now described.

The refrigeration system comprises a refrigeration cell inside which an evaporator 2 and an expansion valve 3 are arranged.

The evaporator is connected to a compressor 4, which is in turn connected to a condenser 5 and to a reservoir 6 which is connected to the expansion valve 3.

The connection between the evaporator 2 and the compressor 4 is a connection in which gas at low pressure flows, while the connection between the compressor 4 and the condenser 5 is a connection in which high-pressure gas is present.

A liquid line is provided between the reservoir 6 and the expansion valve 3.

The refrigeration cycle provided by means of the system shown in FIG. 3 is illustrated schematically in the enthalpy chart of FIG. 2.

The point 1 of the chart corresponds to a step during which the refrigerant gas is at a pressure P1 in the dry saturated steam region; in this condition, it is aspirated by the compressor and compressed to the point 2, which corresponds to a pressure P2>P1.

The compression work applied to the gas by the compressor 4 is given by the difference in enthalpy H2−H1 and approximately corresponds to the energy expenditure of the refrigeration system.

The temperature of the gas at the point 2 increases with respect to the temperature at the point 1: compression normally occurs in a very short time and it is therefore possible to consider this as an adiabatic transformation (i.e., involving no heat exchange).

The high-pressure gas is then sent to the condenser 5, in which heat is removed.

Desuperheating occurs in the first part of the condenser 5, and the rigerant gas passes from the point 2 on the chart of FIG. 3 to the point 3 the same chart, and actual condensation begins, until all the gas is in the liquid state and is therefore subcooled until it reaches the point 4.

The expansion valve 3, arranged upstream of the evaporator 2, is designed to create a pressure drop at constant enthalpy; i.e., the energy content of the refrigerant gas does not vary in this step.

With reference to the chart of FIG. 2, the cycle passes from point 4 to point 5, at which it is in the wet vapor region.

Then the partially evaporated gas at low pressure and at low temperature is sent to the evaporator 2, where the actual refrigeration effect occurs.

Inside the evaporator 2, the gas, by absorbing heat from outside, evaporates completely and therefore superheats to the point 1 of the chart of FIG. 2.

The refrigeration effect produced by this cycle is given by H1−H5. At this point the cycle is repeated.

The theoretical efficiency of the described cycle is H1−H5/H2−H1.

The main variables to be defined, in addition of course to the refrigerating capacity of the system, are the evaporation pressure and the condensation pressure.

The evaporation pressure is chosen according to the temperature of the refrigeration cell 1 to be cooled, in which the evaporator 2 is immersed, and according to the characteristics of the evaporator.

The condensation pressure is instead usually determined by the maximum temperature that can be reached by the medium used to cool the condenser 3 (usually air), plus the temperature difference required by the condenser to operate.

Therefore, for example in the case of an external air temperature (on the condenser 5) of at most 35° C., and of a condenser characterized by a temperature difference of 5° C., the condensation pressure corresponds to the temperature of 40° C.

However, the temperature of the condensation air can drop considerably, accordingly entailing a decrease in the condensation pressure.

In this case, the values of the condensation pressure may become so low as to prevent the correct operation of the expansion valve 3 and therefore the entire system stalls.

It should be noted that the purpose of the expansion valve is to provide the isenthalpic expansion of the refrigerant fluid and requires a minimum pressure difference between the inlet and the outlet for its correct operation.

This problem is normally solved by appropriately varying the ventilation on the condenser 5 so as to maintain a condensation pressure that corresponds to approximately 35° C.

Ventilation is normally reduced by sequentially shutting down the fans 7, in the case of a multiple-fan condenser, or by reducing the rotation rate of said fans.

The actual refrigeration cycle, therefore, does not occur at the lowest possible condensation pressure (determined by the temperature of the condensation air), but is limited downwards so as to ensure circulation of the refrigerant gas.

Optimized energy consumption is not achieved in this way.

SUMMARY OF THE INVENTION

The aim of the present invention is to provide a refrigeration system in which energy consumption is optimized with respect to conventional systems.

Within the scope of this aim, an object of the present invention is to provide a refrigeration system which allows gas refrigeration to occur at the lowest possible pressure.

Another object of the present invention is to provide a refrigeration system which allows the compressor of the system to operate at lower temperatures and pressures than normally provided in conventional systems, thus reducing the wear of said compressor.

Another object of the present invention is to provide a refrigeration system whose overall refrigeration capacity is higher than that of conventional systems.

Another object of the present invention is to provide a refrigeration system in which the main section of the system is subjected to lower operating temperatures than those of conventional systems.

Another object of the present invention is to provide a refrigeration system in which the main compressors are quieter than the compressors of conventional systems.

Another object of the present invention is to provide a refrigeration system which can be used as a high-efficiency conditioning system.

Another object of the present invention is to provide a refrigeration system which can allow to provide high-efficiency heat pumps.

Another object of the present invention is to provide a refrigeration system which is highly reliable, relatively easy to manufacture and at competitive costs.

This aim, these objects and others which will become apparent hereinafter are achieved by a refrigeration system having a refrigeration cycle which provides optimized consumption, comprising a main section, which comprises at least one main compressor, a main condenser, which is connected between said compressor and at least one expansion valve, and at least one evaporator, which is connected to said expansion valve, characterized in that it comprises an auxiliary section which comprises at least one auxiliary compressor which is connected to a low-pressure intake line of said main compressor, an optional auxiliary condenser which is connected to said auxiliary compressor, and a first auxiliary reservoir and a second auxiliary reservoir which are respectively connected to the output of said optional auxiliary condenser and to the output of said main condenser, for connection to said at least one expansion valve.

BRIEF DESCRIPTION OF THE DRAWINGS

Further characteristics and advantages of the invention will become apparent from the description of a preferred but not exclusive embodiment of the system according to the invention, illustrated only by way of non 5 limitative example in the accompanying drawings, wherein.

DESCRIPTION OF THE PREFERRED EMBODIMENTS

Figure 3:
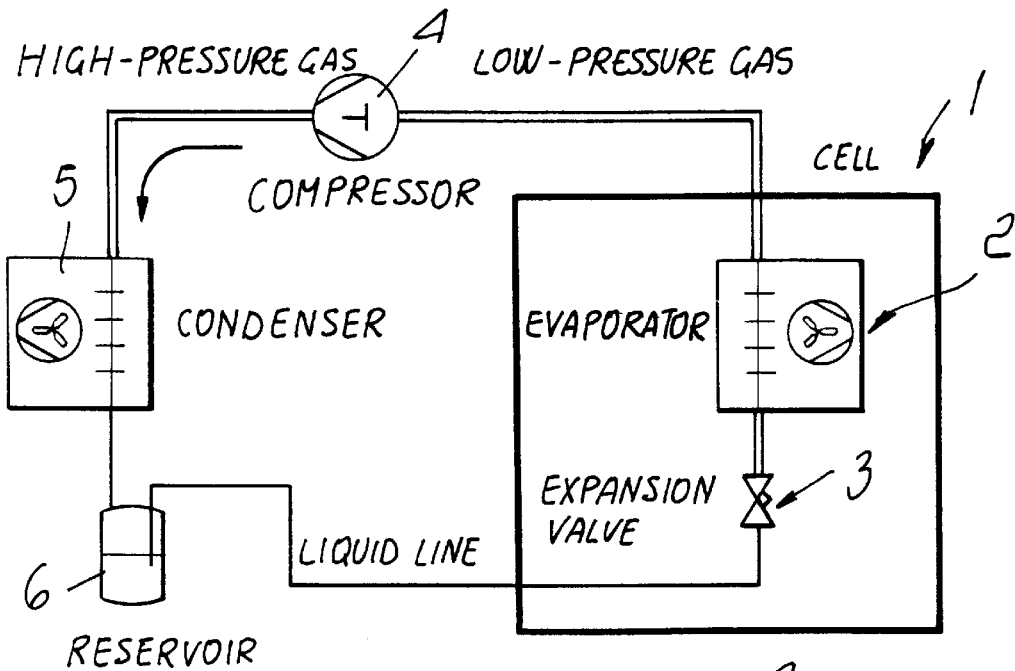
FIG. 3 is a schematic view of a conventional refrigeration system.

With reference to FIGS. 4 to 8, the refrigeration system according to the present invention comprises, like the system shown in FIG. 3, a refrigeration cell 1 which internally accommodates an evaporator 2 and an expansion valve 3.

Figure 4:
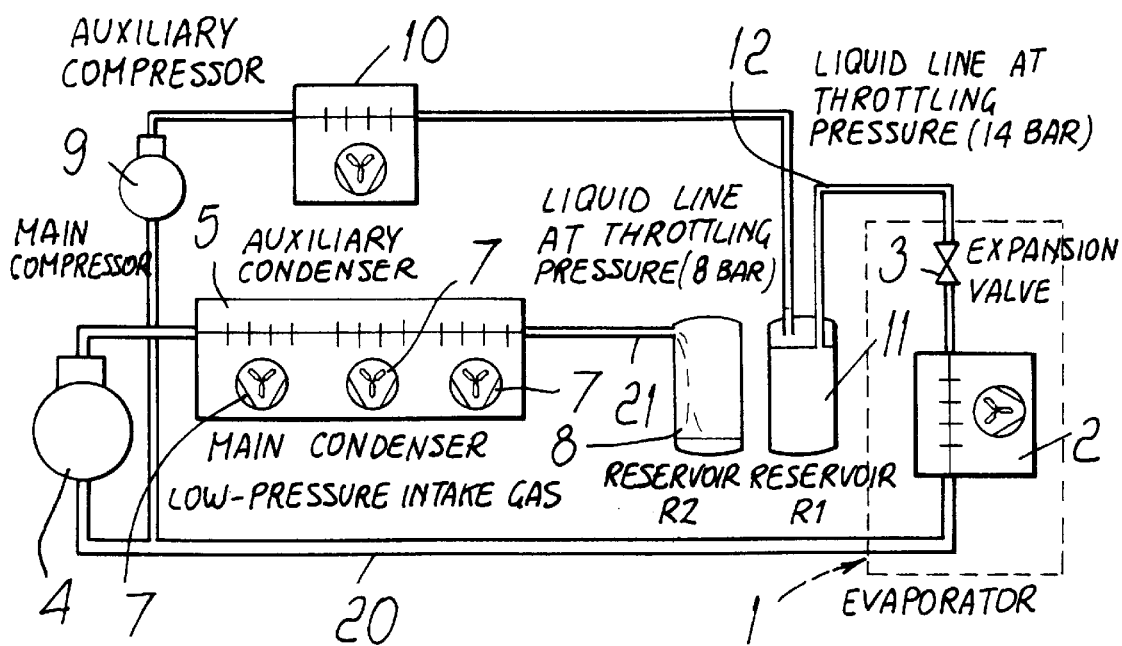
FIG. 4 is a schematic view of a refrigeration system according to the present invention.

It should be noted that FIG. 4 uses the same reference numerals as FIG. 3 to designate corresponding elements.

At least one main compressor 4 is connected to the evaporator 2 by means of a duct in which intake gas, designated by the reference numeral 20, flows at low pressure.

Moreover, the compressor 4 is connected to a main condenser 5, which is provided with ventilation means 7 and is in turn connected to a reservoir 8.

In practice, the refrigeration system according to the invention has a first section, which comprises the main compressor 4, the main condenser 5 and the reservoir 8, and is capable of condensing the gas drawn from the intake line 20 and compressed by the main compressor 4 at the lowest possible temperature allowed by the main condenser 5 (and by its cooling medium).

The refrigerant fluid in output (at low pressure) accumulates in the reservoir 8, which is initially empty.

The connection between the main condenser S and the reservoir 8 is provided by means of a liquid line 21 at the condensation pressure (for example approximately 8 bar).

The system according to the invention has a second or auxiliary section which is composed of an auxiliary compressor 9, an optional auxiliary condenser 10 and a second or auxiliary reservoir 11.

In order to allow to regulate the throttling pressure it is possible to vary the flow rate of the auxiliary compressor 9 using an inverter or any other adapted device. Instead of using the auxiliary condenser 10, it is possible to use a choke on the intake line toward the auxiliary compressor 9, with the aim of adjusting the throttling pressure, which can also be controlled with other conventional methods.

The second section instead operates at the throttling pressure, and the second reservoir 11 is connected to the expansion valve 3 by means of a liquid line 12 at the throttling pressure (for example approximately 14 bar).

The throttling pressure, which is kept constant, ensures a delivery pressure of the circuit which is sufficient to feed the expansion valve 3.

The gas compressed by the auxiliary compressor 9 in fact reaches the reservoir 11 (which is initially full) and pushes the liquid contained therein toward the expansion valve 3 at the throttling pressure.

When the reservoir 11 is empty and the reservoir 8 is instead full, the system must be able to functionally swap the two reservoirs, and the filling and emptying cycle is repeated.

Clearly, the refrigerant liquid that arrives from the main section is at low temperature and pressure, and when functional reservoir swapping occurs it is subjected to the throttling pressure and is therefore greatly subcooled.

A possible circuit embodiment of the system shown schematically in FIG. 4 is described hereinafter.

The auxiliary compressor is connected to the low-pressure line 20.

Conveniently, the main section of the refrigeration system shown in FIG. 4 comprises a plurality of main compressors 4 and a plurality of cells 1 which are arranged in parallel to each other.

It is conveniently possible to provide also a spare auxiliary compressor 9.

Figure 6:
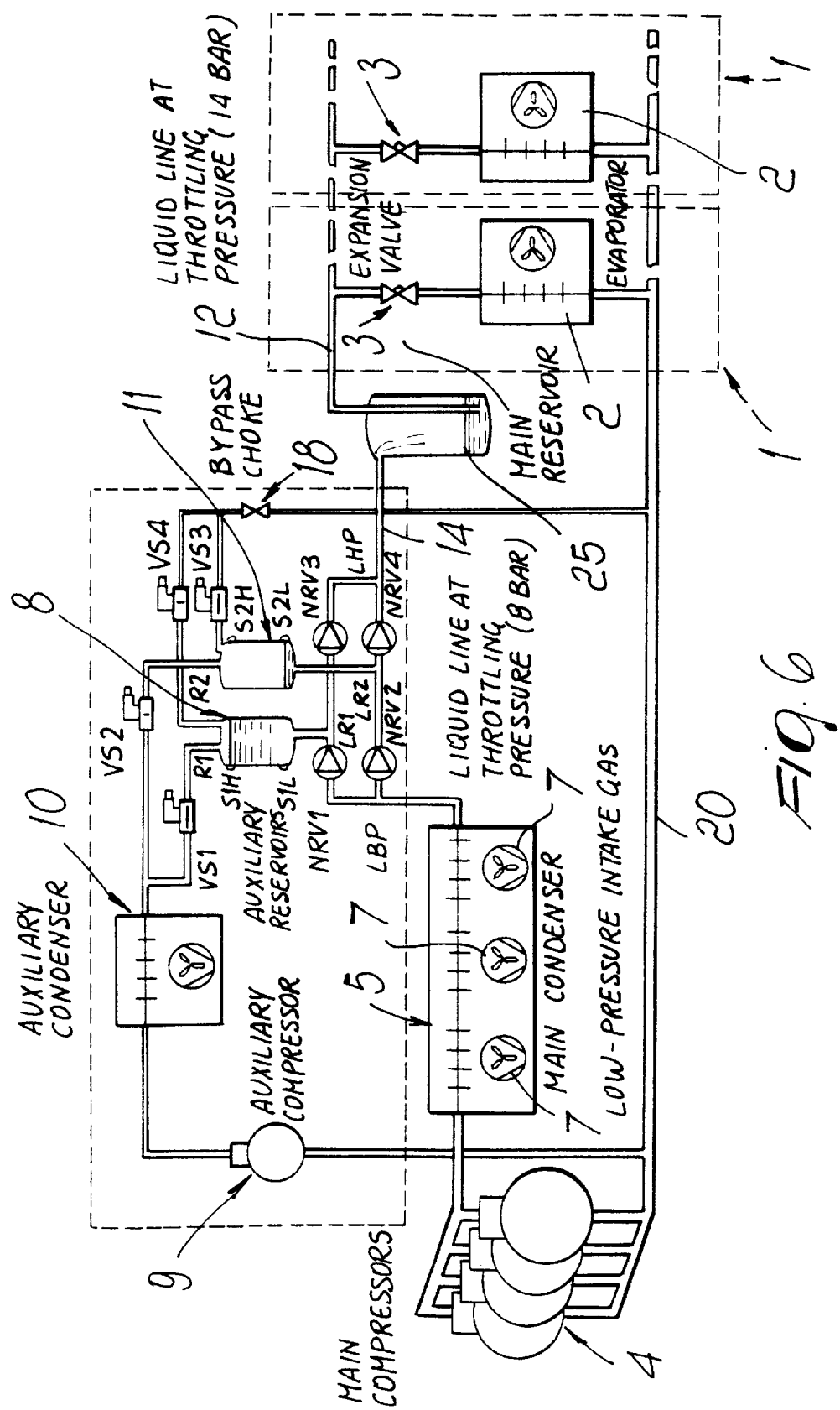
FIGS. 6 to 8 are schematic views of the various operating steps of the refrigeration system according to the present invention.

FIG. 6 is a detailed view of the actual circuit of the refrigeration system according to the invention, illustrated only by way of schematic example in FIG. 4.

Figure 7:
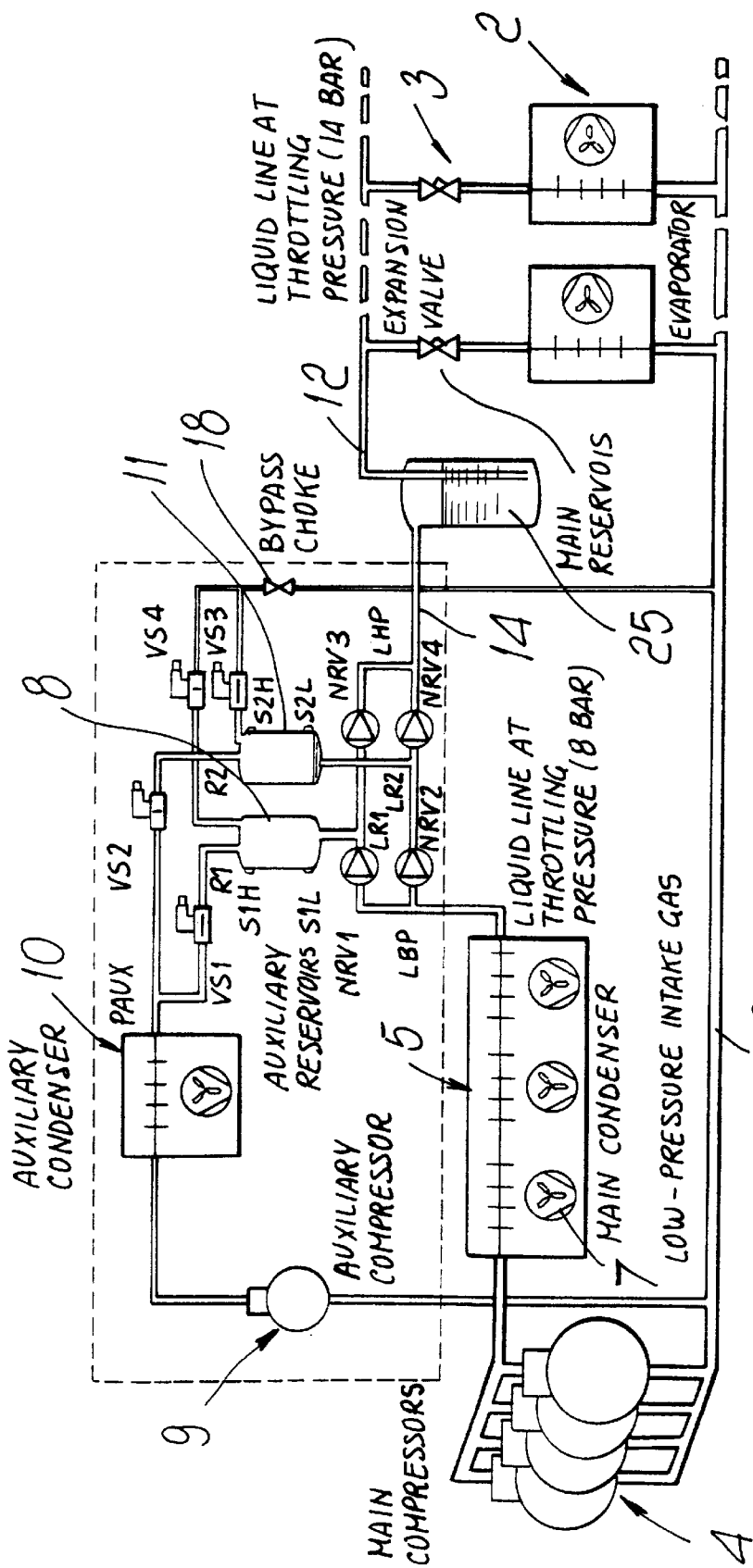
Figure 8:
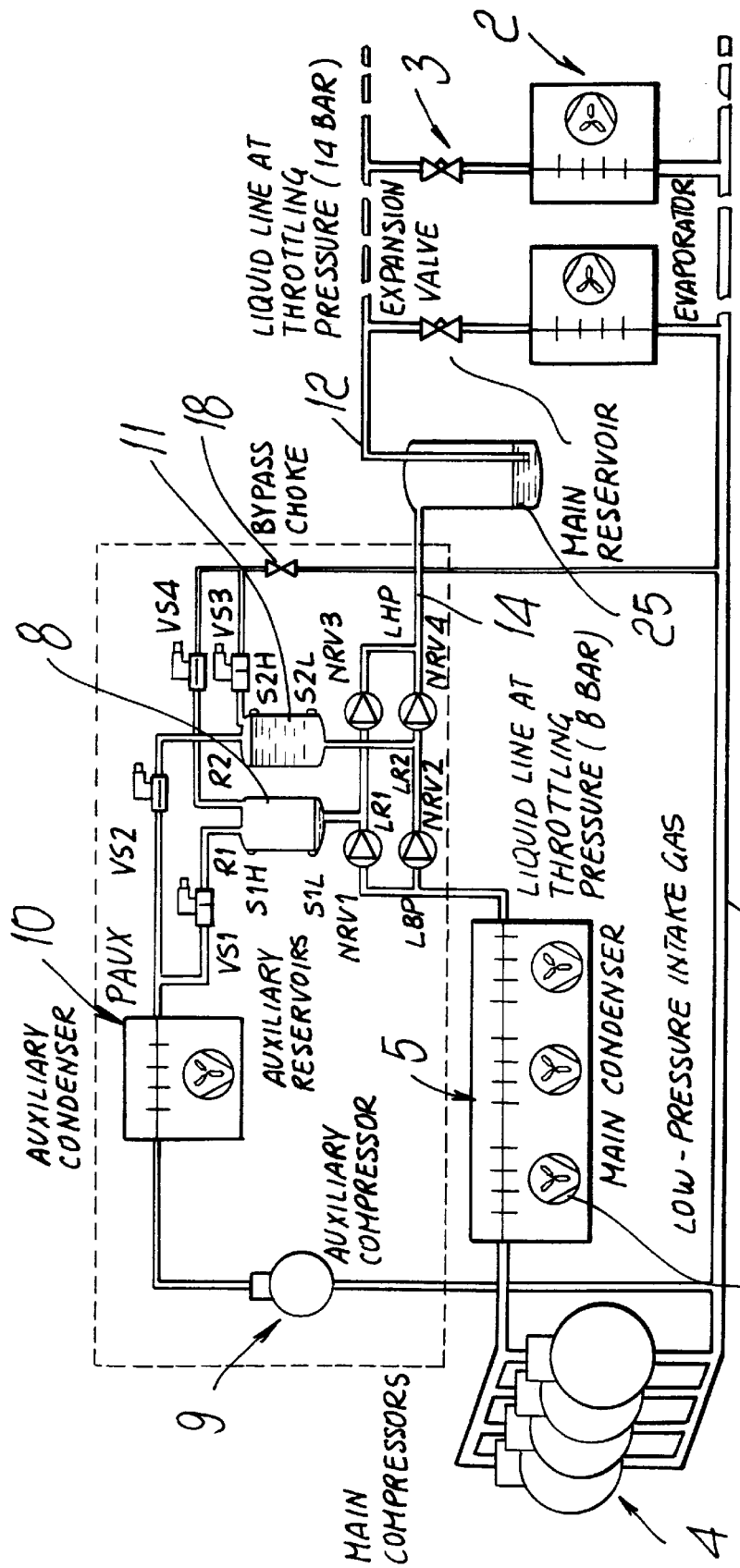

FIG. 6 illustrates, in particular, a first step of the operation of the refrigeration system according to the invention, and FIGS. 7 and 8 illustrate further steps of its operation.

With reference to the diagram of FIG. 6, the first reservoir 8 is part of the main section, while the second reservoir 11 is part of the auxiliary section of the refrigeration system according to the invention.

The first and second reservoirs mutually swap their functions.

In detail, the first or auxiliary reservoir 8 is connected to the auxiliary condenser by means of a valve VS1 and is connected to the output of the main condenser 5 by means of a non-return valve NRV1 and is then connected to the expansion valves 3 by means of a high-pressure line 14 and an additional non-return valve NRV3.

Likewise, the second reservoir 11 is connected to the auxiliary condenser 10 by means of a valve VS2 and is then connected to the output of the main condenser 5 by interposing a non-return valve NRV2 and is connected, by means of an additional non-return valve NRV4, to the low-pressure line 14 that leads to the connection to the expansion valves 3.

Furthermore, each reservoir 8 and 11 is connected to the low-pressure line 20 by means of respective valves VS4 and VS3 and a bypass choke 18.

Conveniently, it is possible to provide a main reservoir 25 which is connected in output to the main condenser 5, upstream of the expansion valves 3.

Alternatively, by choosing appropriate sizes for the auxiliary reservoirs 8 and 11 it is possible to eliminate the main reservoir 25.

In general, the refrigeration system according to the invention has a main section which comprises one or more main compressors 4, a main condenser 5 and one or more refrigeration cells, the output of the main condenser being connected to the expansion valves of the respective refrigeration cells 1; there is also an auxiliary section, which comprises one or more auxiliary compressors 9, an optional auxiliary condenser 10, and a first auxiliary reservoir 8 and a second auxiliary reservoir 11 which are respectively interposed between the output of the main condenser 5 and the throttling valves 3 of the respective refrigeration cells 1.

Figure 5:
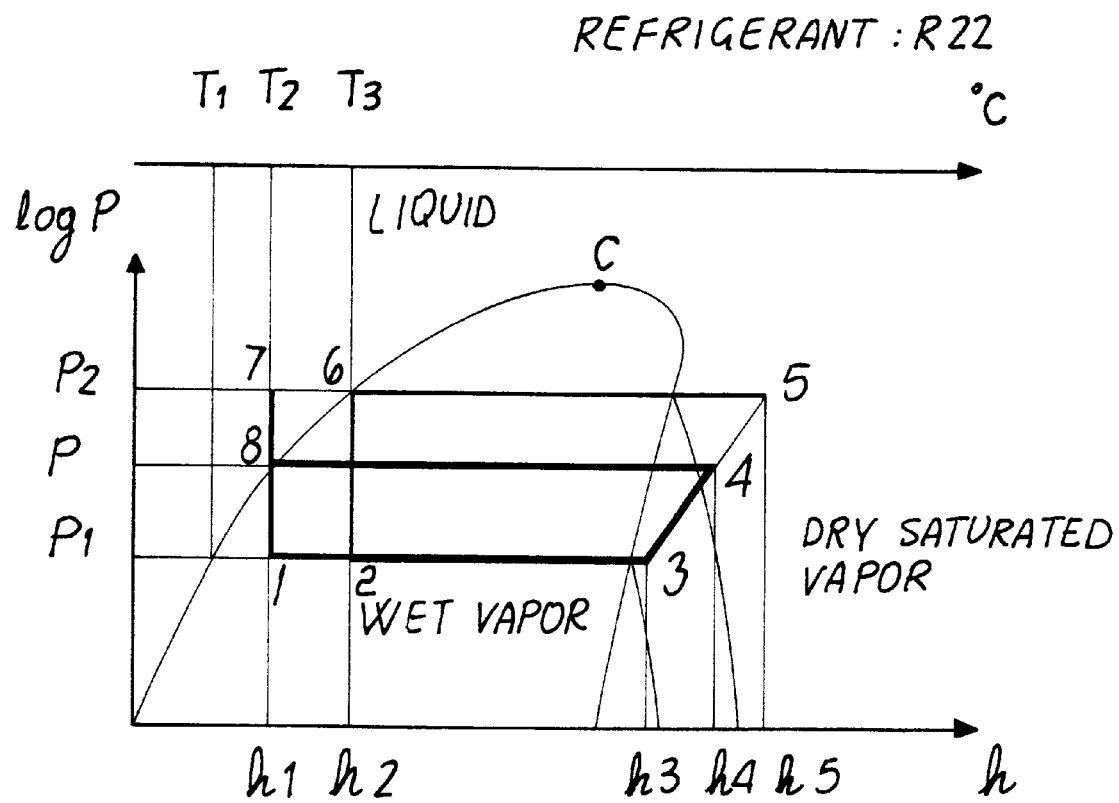
FIG. 5 is an enthalpy chart on which the refrigeration cycle provided by means of the system according to the present invention is superimposed.

FIG. 5 schematically plots, on the enthalpy chart, the refrigeration cycles that are present in the refrigeration system according to the invention.

One can distinguish the cycle followed by the gas that circulates in the main circuit (1→3 evaporation, 3→4 compression, 4→8 condensation, 8→7 reservoir swapping, 7→1 throttling) from the cycle followed by the gas that circulates in the auxiliary circuit (2→3 evaporation, 3→5 compression, 5→6 condensation, 6→2 throttling).

Figure 1:
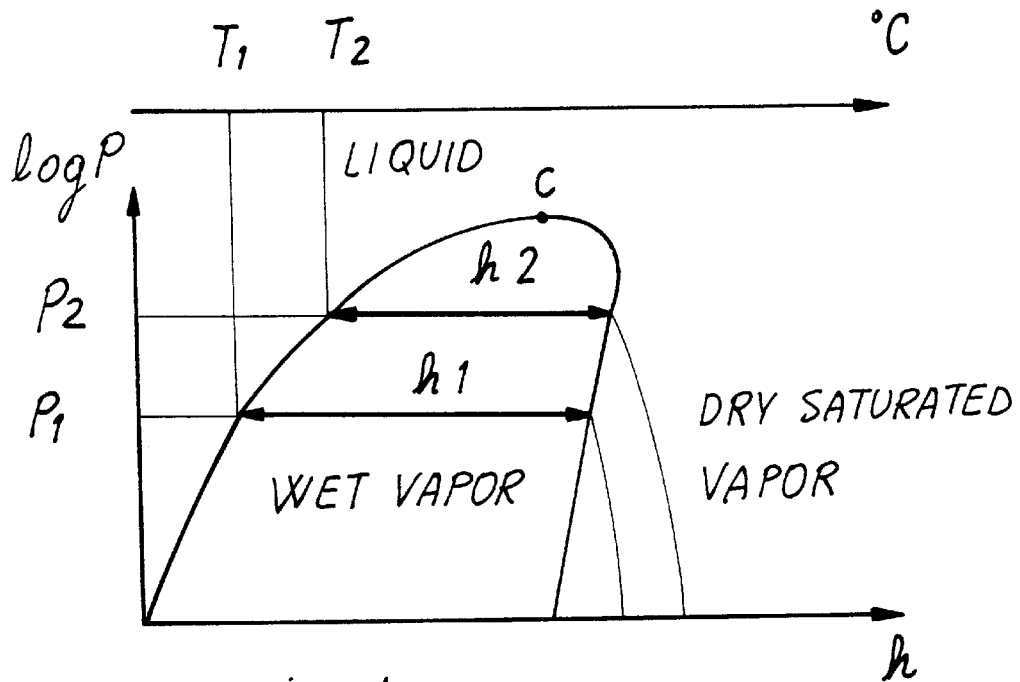
FIG. 1 is a conventional enthalpy chart.
Figure 2:
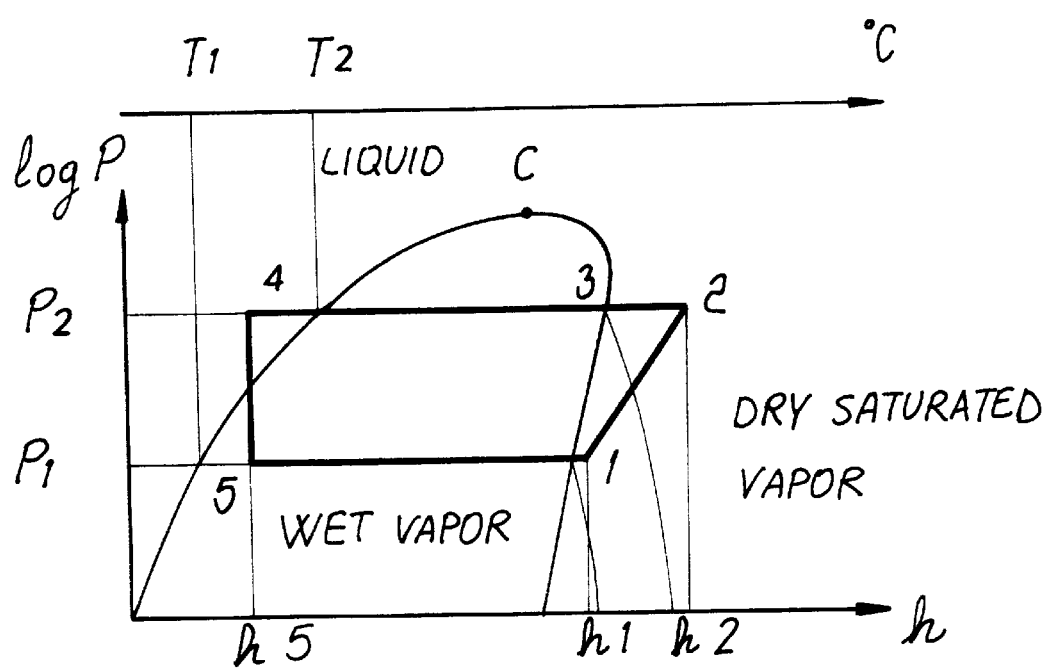
FIG. 2 is an enthalpy chart on which a conventional refrigeration cycle is superimposed.

In actual fact, since the two circuits, i.e., the main one and the auxiliary one, are separated only in the condensation section, the coordinates of the refrigerant liquid being fed (inlet of the expansion valve) on the chart of FIG. 2 lie between the point 6 and the point 7, and likewise at the inlet of the evaporator the coordinates will lie between point 1 and point 2.

Again with reference to FIG. 5, one can see that the compression energy expenditure of the auxiliary circuit is equal to H5–H3 and that the refrigeration output varies from H3–H2, exactly as in any conventional system.

The primary refrigeration cycle instead has a compression energy expenditure equal to H4–H3, with a refrigeration output which is equal to H3–H1 and with a refrigeration efficiency which is much higher than the preceding one, i.e., the following relation applies: (H3–H1)/(H4–H3) much greater than (H3–H2)/(H5–H3).

Experimental tests have allowed to determine the gas flow-rate on the auxiliary circuit, equal to approximately $\frac{1}{10}$ of the flow-rate of the primary circuit, with an evident energy saving with respect to a conventional system.

With reference to FIGS. 6 to 8, the operation of the refrigeration system according to the invention is as follows.

The initial condition is shown in FIG. 6, in which the level of the liquid in the reservoir 8 has exceeded the level determined by the sensor S1H and in the reservoir 11 the level of the liquefied gas is below the level determined by the sensor S2L.

In this condition, the auxiliary compressor 10 draws the refrigerant gas from the intake line and feeds it at high pressure to the auxiliary condenser 10, in which a partial condensation occurs which is regulated (in the case of an air-cooled condenser) by the actuation and deactivation of the fan of the auxiliary condenser 10 (or by a variation in its speed), so as to keep the pressure at values which allow correct throttling in the thermostatic valves.

In this step, the electric valve VS1 is open, while the electric valve VS2 is close, and therefore the gas reaches the auxiliary reservoir 8, where it pressurizes the liquid contained therein; the high-pressure liquid, by flowing along the line LR1, the non-return valve NRD2 and the line 14, reaches the main reservoir 25 (if provided), which rapidly fills.

If such reservoir is not present, the line 14 connects the auxiliary reservoirs 8 and 11 directly to the expansion valves 3.

At the end of this transfer step, which is relatively quick, one has the condition shown in FIG. 7, in which the partially condensed gas reaches the main reservoir 25 and maintains the liquid delivery line at the condensation pressure, i.e., at the pressure that is present at the output of the auxiliary condenser 10.

The main compressor or compressors 10 in this step operate normally, and the gas drawn from the low-pressure intake line 20 is sent to the main condenser 5, where condensation occurs at the lowest possible pressure.

At this point, the low-pressure refrigerant liquid, by flowing along the line in output from the main condenser 5, the non-return valve NRV2 and the line LR2, reaches the auxiliary reservoir 11 and fills it.

The filling of the reservoir 11 is facilitated by the fact that since the valve VS3 is open (while VS4 is closed), a small amount of the gas, by passing through the bypass choke 18, reaches the intake line, thus contributing to reduce pressure in the auxiliary reservoir 11 thus facilitating filling with the liquid that arrives from the main condenser 5.

In this second step, the auxiliary reservoir 11 fills with the liquid at low pressure and low temperature that arrives from the main condenser 5, and simultaneously the main reservoir 25 is emptied of the liquid maintained at high pressure by the auxiliary compressor 9.

The end of this step occurs when the level set by the sensor S2H is reached by the liquid in the auxiliary reservoir 11. During this step, all the electric valves change state and one has a situation such as the one shown in FIG. 8, which corresponds to what is shown in FIG. 6, except that the functions of the auxiliary reservoirs 8 and 11 are swapped.

A transfer step then occurs again and the cycle is repeated.

It is noted that the main compressors 4 constantly have the lowest discharge pressure allowed by the condensation exchanger, and that the auxiliary compressor 9 constantly keeps the liquid air supply pressure at values which are adequate for correct operation of the throttling valves.

The refrigeration system according to the invention therefore allows the main section of the system to operate in optimum conditions, allowing in theory condensation at any temperature, the only limitation being due to the operating characteristics of the compressor.

The auxiliary circuit instead ensures the correct supply pressure on the expansion valves in every operating condition and helps to generate cold, with considerable energy savings.

Furthermore, the intense subcooling of the liquid eliminates the possibility of the so-called flash gas effect in the delivery piping.

In practice it has been observed that the refrigeration system according to the invention fully achieves the intended aim, since it allows to optimize the energy consumption of the system, increasing the overall refrigeration capacity and with less mechanical stress on the main section, which is assisted by the presence of the auxiliary section.

The refrigeration system thus conceived is susceptible of numerous modifications and variations, all of which are within the scope of the inventive concept; all the details may furthermore be replaced with other technically equivalent elements.

In practice, the materials used, so long as they are compatible with the specific use, as well as the dimensions, may be any according to requirements and the state of the art.

The disclosures in Italian Patent Application No. TV99A000044 from which this application claims priority are incorporated herein by reference.

What is claimed is:

1. A refrigeration system having a refrigeration cycle which provides optimized consumption, comprising a main section, which comprises at least one main compressor, a main condenser, which is connected between said compressor and at least one expansion valve, and at least one evaporator, which is connected to said expansion valve, comprises an auxiliary section which comprises at least one auxiliary compressor which is connected to a low-pressure intake line of said main compressor, an auxiliary condenser which is connected to said auxiliary compressor, and a first auxiliary reservoir and a second auxiliary reservoir which are respectively connected to the output of said optional auxiliary condenser and to the output of said main condenser, for connection to said at least one expansion valve.

2. The refrigeration system according to claim 1, wherein said main condenser is connected, by means of a low-pressure line, to two non-return valves which connect said low-pressure line to said auxiliary reservoirs, an additional pair of non-return valves being provided downstream of said auxiliary reservoirs in order to enable/disable the connection with said at least one expansion valve.

3. The refrigeration system according to claim 1, wherein said auxiliary condenser is connected to said auxiliary reservoirs by means of two valves.

4. The refrigeration system according to claim 1, wherein a bypass choke is provided between said low-pressure intake line and said auxiliary reservoirs, on a side for connecting said reservoirs to said at least one auxiliary condenser, two valves being provided between said bypass choke and said auxiliary reservoirs.

5. The refrigeration system according to claim 1, wherein said auxiliary reservoirs are connected to said at least one expansion valve by means of a high-pressure line.

6. The refrigeration system according to claim 5, comprising a main reservoir which is interposed between said high-pressure line downstream of said auxiliary reservoirs and said at least one expansion valve.

7. A method for cooling at least one refrigeration cell by means of a refrigeration system, comprising the steps of:

starting from a condition in which a first auxiliary reservoir is filled with a liquefied gas and a second auxiliary reservoir is empty, introducing a refrigerant gas, by means of an auxiliary compressor, in an auxiliary condenser in which said gas is condensed and sent to said first auxiliary reservoir, pressurizing said liquefied gas contained therein;

transferring the content of said first auxiliary reservoir to at least one expansion valve in order to reach at least one evaporator of said at least one refrigeration cell;

drawing, by means of a main compressor, refrigerant gas from a low-pressure intake line and sending said refrigerant gas to a main condenser and then to said second auxiliary reservoir, filling it; and transferring the contents of said second auxiliary reservoir to said at least one expansion valve, in order to send them to said at least one evaporator.

8. The method according to claim 7, wherein said liquefied refrigerant gas fed into said first and second auxiliary reservoirs at different times during the cycle is a high-pressure or low-pressure gas, depending on whether its source is, respectively, said auxiliary compressor or said main compressor.

9. The method according to claim 7, wherein the discharge pressure of said at least one main compressor is constantly at the minimum value allowed by the corresponding condenser.

10. The method according to claim 9, wherein the discharge pressure of said at least one auxiliary compressor is constantly higher than the discharge pressure of said at least one main compressor.

11. The method according to claim 7, wherein the transfer of said first and second auxiliary reservoirs occurs by transferring the liquefied gas contained therein to the main reservoir.

12. The method and the system according to claim 7, wherein throttling pressure control is allowed by means of a capillary tube used as an expansion valve.

* * * * *